United States Patent [19]
Nelson et al.

[11] Patent Number: 5,114,570
[45] Date of Patent: May 19, 1992

[54] WATER FILTER CARTRIDGE

[75] Inventors: Sharon L. Nelson; John E. Petrovic; Gerald T. Swanson, all of Fort Collins, Colo.

[73] Assignee: Teledyne Industries Inc., Fort Collins, Colo.

[21] Appl. No.: 393,262

[22] Filed: Aug. 14, 1989

[51] Int. Cl.$^5$ .................. B01D 27/02; B01D 27/07; B01D 27/08

[52] U.S. Cl. .................. 210/94; 210/282; 210/288; 210/315; 210/416.3; 210/437; 210/489

[58] Field of Search .................. 210/282, 288, 416.3, 210/443, 85.94, 315, 457, 489

[56] References Cited

U.S. PATENT DOCUMENTS

| | | | |
|---|---|---|---|
| 4,504,389 | 3/1985 | Rundzaitis | 210/424 |
| 4,591,438 | 5/1986 | Tanabe et al. | 210/282 |
| 4,686,037 | 8/1987 | Lang | 210/288 |
| 4,814,078 | 3/1989 | Stern et al. | 210/282 |

Primary Examiner—Robert A. Dawson
Assistant Examiner—Wanda L. Millard
Attorney, Agent, or Firm—Hugh H. Drake

[57] ABSTRACT

A water filter cartridge has a cylindrical shell. A conduit runs between closing end walls and is disposed within a filtration material. There are additional openings in the respective end walls for communicating the flow of water through the material. A water filtration element of a porous medium is shaped to nest within a portion of the shell encircling a corresponding portion of the filtration material and defining space between the medium and the inner side wall of the shell with that space being in the water flow path from one of the end walls and the material through the medium. A reference color is exhibited over a portion of the exterior side wall of the shell adjacent to the location of the medium inside the shell, and the medium exhibits a given color upon beginning of usage but changes color with continued usage in response to its entrapment of matter in the water. The shell is transparent over the medium to enable the user to compare the medium color to the reference color. The filtration material is secured in place by a plug forming one of the end walls and which has an opening around its periphery with a water pervious ring being sandwiched between that peripheral opening and the space defined on the outside of the filtration medium.

22 Claims, 1 Drawing Sheet

U.S. Patent
May 19, 1992
5,114,570
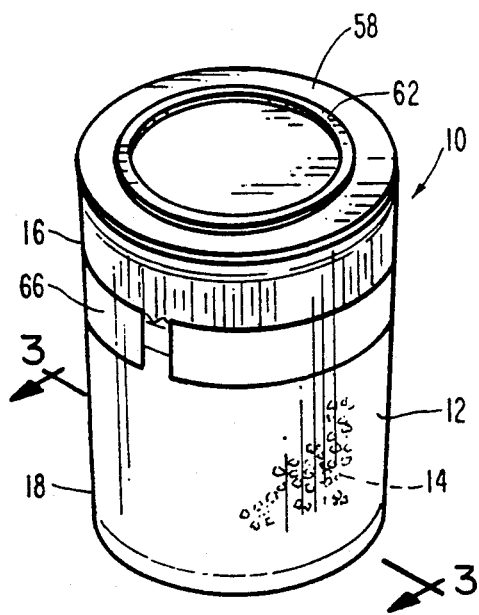
FIG. 1
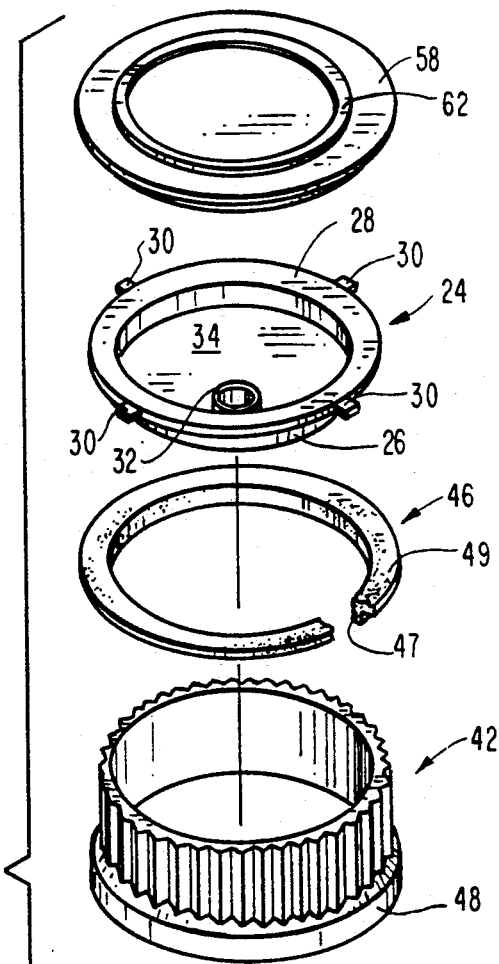
FIG. 2
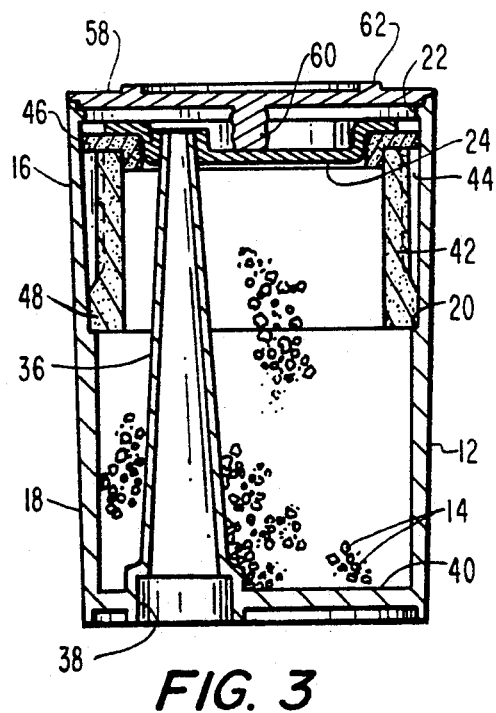
FIG. 3
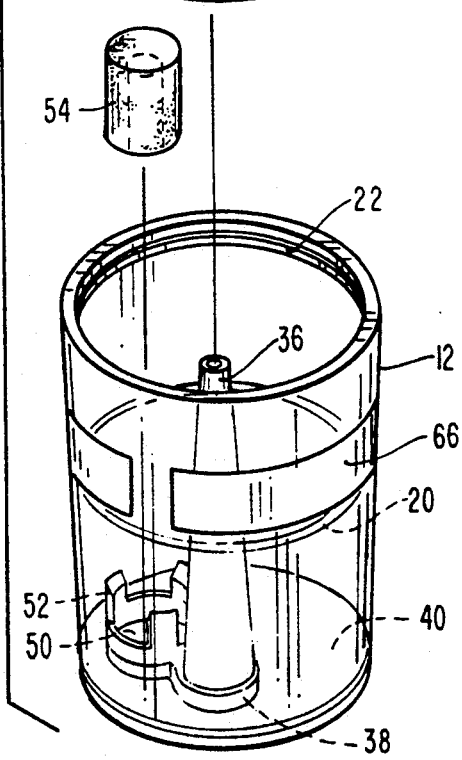

WATER FILTER CARTRIDGE

The present invention relates to water filter cartridges. More particularly it pertains to replaceable cartridges for water filter apparatus of various types such as faucet attachment, vegetable spray and portable units.

Water filters which range in use between industrial applications and individual units for the home have featured replaceable filter cartridges. Typical are those cartridges described in prior U.S Pat. Nos. 4,107,046, 4,147,631, 4,770,768, 4,151,092, 4,172,796 and 4,686,037, all assigned to applicant's assignee. As might be seen just by reference to the numerous prior patents cited against the applications from which those patents matured, the art has been continuing development for a long time. While several different modes of filter use were featured as among different ones of the aforementioned patents, one common feature among them all was that of making it possible to use any of the several different types of cartridges disclosed in others of the filters concerned which were intended primarily for a different type of appliance.

One objective of the present invention is to provide a new and improved water filter cartridge which may continue that theme although that is not a necessary requirement.

One feature in the aforesaid U.S. Pat. No. 4,687,037 is the provision of a prefilter which exhibits a white color at the beginning of use of the cartridge but which gradually darkens in color with continued usage of the cartridge as impurities in the water are trapped within the prefilter. A white reference ring surrounds that prefilter so that the user may have a better comparison against which to judge degree of usage. Unfortunately the area of display is comparatively small as viewed by the user at a distance and, when the cartridge is used in some appliance versions, may be fully or partially concealed.

Another objective of the present invention is to adapted that basic color comparison technique in a manner which provides a much larger and more visible comparison area.

A further object of the present invention is to provide a new and improved water filter cartridge which has parts which so interfit and match as to facilitate and improve manufacturing capability.

In some of the prior filtering appliances, a cap separate from the cartridge itself has been required in order both to secure the cartridge in place and also to serve as part of the definition of flow passage.

A still further object of the present invention is to use a construction in which a separate cap is not necessary although it may still be employed to secure the cartridge in place, while at the same time, a new and improved water filter cartridge may be so formed as still to relay on such a separate cap for water channeling purposes.

In accordance with one aspect of the present invention, a water filter cartridge has a shell within which is confined a water filtration material and which has opposite first and second end walls. A conduit is disposed through the material from a first opening in one of those end walls to a second opening in the other of the end walls. A third opening in one of the end wall sis spaced from one of the first and second openings for communicating the flow of water with the material, and a fourth opening in the other of the end walls spaced from the other of the fist and second openings communicates the flow of water with the material at a location spaced from the third opening. A water filter element of a porous medium is shaped to nest within a portion of the shell encircling a corresponding portion of the material and defining a space between the medium and the inner side wall of the shell with that space being in the path of water flow between the third opening and the material to the medium. A feature involves the exhibiting of a reference color over a portion of the exterior side wall of the shell adjacent to the location within the shell of the medium which exhibits a given color upon the beginning of usage but which changes color with continued usage in response to its entrapment of matter. The shell is transparent over the medium to enable a user to compare the medium and reference colors.

In accordance with another aspect of the invention, the water filtration element disposed in the combination described above includes the definition of the third opening on the periphery of the corresponding end wall to overlie the space between the medium and the inner side wall. This feature is preferably implemented by forming the third opening around a plug which forms a corresponding end wall. The related preferable feature is implemented by including a water-pervious filter ring nested within the shell at one end of the filtration element and between the aforesaid space and the third opening.

The features of the present invention which are believed to be patentable are set forth with particularity in the appended claims. The organization and manner of operation of the invention, together with further objects and advantages thereof, may best be understood by referenced to the following description of one or more specific embodiments thereof taken in connection with the accompanying drawings, in the several figures of which like reference numerals identify like elements and in which:

FIG. 1 is an isometric view of a water filter cartridge;

FIG. 2 is an exploded isometric view of the water filter cartridge shown in FIG. 1; and FIG. 3 is a cross-sectional view taken along the line 2—2 in FIG. 1.

As presently embodied, cartridge 10 has a configuration enabling it to be used in any of the apparatus described in the prior patents mentioned in the introduction hereto. Thus, what might be thought of in terms of being an inlet end wall as used in one of those applications may turn out to be an outlet end wall as the cartridge is used in a different one of the applications. Similarly, what might be though of in one case as being an inlet opening in one of the end walls may turn out in use to be an outlet opening as employed in a different mode of application. As also explained in one or more of those prior applications, the primary function of a given component other than the walls and openings may be reversed as between different applications and in certain of the applications may not be particularly effective if use is made of its function at all. Accordingly, directional and functional terms as used herein are only for orientational purposes with reference to a specific embodiment as used in a faucet-attachment like that in U.S. Pat. No. 4,686,037.

In any case, cartridge 10 has a generally cylindrical shell 12 within which is confined in water filtration material 14. Material 14 preferably is an activated carbon of which there are numerous sources. Whatever the source and its exact nature, material 14 has the purpose of removing from the water flow organic materials including those which tend to adversely affect taste and odor.

As mentioned, shell 12 is generally cylindrical as embodied. Correspondingly, it will be observed that other components which mate with shell 12 also have a cylindrical shape. Instead of being cylindrical, shell 12 could be polygonal including rectangular. While that may facilitate use in some particular appliance construction, such other shapes are not preferred from the water filtering viewpoint because they lead to more inefficient use of the volume of filtration material present. Round shapes also are more desirable from a structural standpoint, because that avoids some corners and surface intersections.

As depicted in FIG. 2, shell 12 has an upper portion 16 and a lower portion 18 with upper portion 16 being more narrow in order to define an inwardly directed offset or shoulder 20 that may be called the boundary between upper portion 16 and lower portion 18. Inwardly projecting and spaced a short distance downwardly from the open end of upper portion 16 is a rib 22.

Seated within shell 12 just below rib 22 is a plug 24 which is generally in the form of an upwardly-opening cup with an outwardly tapering side wall 26 from the upper margin of which is an outwardly projecting lip 28. Circumferentially spaced around the periphery of lip 28 are a series of tabs 30 which are received snugly within the inner wall of upper portion 16. A boss 32 projects through and upwardly from the bottom panel 34 of plug 24 and upon assembly securely receives the upper end of a conduit 36 which becomes progressively smaller away from the bottom of shell 12 where conduit 36 flares into the formation of a well 38 which, in turn, opens through a bottom wall 40 that closes the lower end wall of lower portion 18. The bottom opening into well 38 serves as an inlet or first opening when the cartridge is employed in a water filter appliance of the kind shown in aforesaid U.S. Pat. No. 4,4468,037. Conduit 36 leads through filtration material 14 and is surrounded thereby. At its upper end, conduit 36 in that unit becomes a second or internal outlet opening through the end wall generally formed by plug 24.

A porous polymer filter 42, which serves as a prefilter in the instant implementation, is also of cylindrical form and is shaped to nest within upper portion 16 of shell 10. The porous media of filter 42 encircles the corresponding portion of material 14 which fills the upper portion of the cavity defined within shell 12. However, filter 42 is smaller than the adjacent inner wall of upper portion 16 of shell 12 so as to define a space 44 the upper end of which is aligned beneath the peripheral opening around plug 24 between the respective different ones of tabs 30. Filter element 42 is a porous polymer formulated specifically to act as a depth filter. It desirably exhibits a pore size of approximately twenty-five micron average for a typical water supply. That will lead to significant discoloration after about two-hundred gallons of water usage. While filter 42 apparently may be manufactured in more than one way, a preferred manner of formation found to be entirely satisfactory is that in accordance with the molding technique disclosed in connection with U.S. Pat. Nos. 4,460,530 and 4,373,887, assigned to the same assignee as is the present application.

A water pervious ring 46 is sandwiched snugly between lip 28 and tabs 304 in its upper side and the upper end surface of filter media 42. An enlargement or butt end 48 is shaped into the lower end portion of filter media 42 and serves to seat firmly atop the shoulder defined by upwardly-facing inset 20. Ring 46 is formed of a sintered polymer which exhibits a porosity much more open than the porosity of filter 42.

Another or fourth opening 50 is formed through bottom end wall 40 and around its inner circumference upwardly project a circumferentially-spaced series of lugs 52. Seated within lugs 52 is the lower end of a cylindrical block of porous water filter medium 54. Filter 54 is of hollow cylindrical shape closed at its upper end so that its open lower end communicates with opening 50 in endwall 40.

In the implementation of the cartridge with the water filter assembly of the aforesaid '037 patent, filter 54 serves as a post filter in the same manner as described in that patent, although filter element 54 need not in this case be encased by a deflector as preferably was used in the different cartridge of that patent. Filter element 54 is a porous polymer and is formulated to prevent carbon fines from entering the outlet and emerging through opening 50. It preferably exhibits a pore size of between four- and six-thousandths of an inch or approximately five-thousandths of an inch.

Disposed across and sealing the upper outer end of upper portion 16 of shell 12 is cap 58 from the center of the underside of which a stub 60 projects downwardly into engagement with the upper surface of panel 34 in plug 24. A circular ring 62 is formed on the upper surface of cap 58 at a location inwardly from the periphery of the cap. When installed in a water filer having a canister which overlies and secures cartridge 10 in place, the inner surface of the top wall of that canister securingly seats at op rib 62. Filter cap 58 insures that the filter case is hermetically sealed. In mounting the filter to an appliance casing, there is no need for any water seal around the cartridge.

Ring 46 bends downwardly at its inner perifery to form a collar 47 which is received snugly around wall 36 of plug 24 and from the upper side of which collar the ring is formed into a rim which projects outwardly into a snugly fitting relationship within the inner wall of shell 12. Shell 12 has an inner diameter or cross-section which becomes progressively larger or tapers from end wall 40 to the upper shell end on which cap 58 is seated. Correspondingly, the diameters or lateral dimensions of ring 46 and plug 24 as well as the peripheral diameter of cap 58 and the diameter of butt 48 all are sized to fit snugly within shell 12 at their different locations.

During the preferred mode of assembly, what in this case becomes post filter assembly 54 is first emplaced after which prefilter 42 and ring 46 are also pressed into place. The next step is the filling of shell 12, including the region within prefilter 42, with the activated carbon material 14. Plug 24 is inserted and the opening in panel 34 is fitted onto the upper end of conduit 36. Cap 58 is emplaced and ultrasonically welded around its periphery to the upper margin of upper portion 16 of shell 12.

During the filling operation, ring 46 serves to prevent carbon particles from entering space 44 and being deposited upon the exterior wall of filter 42. If desired, tabs 30 also may be ultrasonically welded to the inner surface of shell 12, although that at least usually does not appear to be necessary because rib 22 serves to secure tabs 30 in place and also to adequately sandwich ring 46 in place all at the same time ensuring secure seating of filter butt 48 on the seat defined by the shoulder at inset 20.

At least substantially encircling shell 12 at or near the junction between upper portion 16 and lower portion 18, around the exterior side 4 wall of the shell adjacent to the location within the shell of filter medium 42, is a band 66 which exhibits a color reference that in this case is white. For that reason, shell 12, or at least upper portion 16 thereof, is transparent. At the beginning of usage of a fresh cartridge, filter medium 42 also is of a bright white. With continued usage, however, particulates and other materials entrapped within filter 42 cause that filter to become gradually darker and darker.

The user is enabled to see through upper portion 16 and observe the large are of filter medium 42 which is becoming darker until the degree of darkness informs the user that it is time to replace the filter. By making shell 12 transparent in its entirety, the user at the same time is also able to observe the very black color of the carbon filter material. This serves as another comparison for the user.

With the user preferably having been instructed that if the darkening color of filter medium 42 even begins to be about half as black as that of the carbon, in comparison to the white of band 66, cartridge replacement is strongly suggested. Color band 66 may be a separately affixed tape but most effectively is silk screened in place at the same time as other indicia might likewise be placed upon the exterior of the cartridge.

Of course, the amount of satisfying usage to be expected with any given water system will depend upon the quality and other characteristics of the incoming water. It has been found in use with a typical municipal water system that there is quite visible discoloration after about two-hundred gallons of water has been caused to pass through the filter unit. In use with the faucet assembly made in accordance with the embodiment of aforesaid U.S. Pat. No. 4,686,037, incoming water is channeled through conduit 36 where it flows outwardly above plug 24 and beneath cap 58 after which the water flows through the peripheral openings formed between tabs 30 on plug 24, through ring 46 and into space 44. From space 44, the water then flows through prefilter 42 and at the same time the water is distributed rather widely through the carbon so that channeling and the resultant generation of carbon fines is minimized.

In one alternative design, ring 46 and plug 24 are integrated into the formation of prefilter 42. In that alternative, which is not as preferred, filter 42 and cap 58 are assembled to shell 12 before post-filter 54 is implaced. The carbon material 14 is inserted through opening 50 to fill the interior of filter 42 and the remainder of shell 12. This approach is less preferable at least because of the increased assembly time which is involved.

In another alternative, filter cap 58 and plug 24 are integrated into a single combined part. In that case, a less desirable solvent bonding of the filter cap to the case would apparently be required because the above-described use of ultrasonic bonding would be at least difficult to accomplish because the welding energy would be directed away from the desired location.

A different approach may be to employ a separate inner shell or case with filter 42 thereafter being assembled to that inner case. That approach could minimize any problem of getting carbon particles on the exterior of filter 42, but again it would lead to increased cost and there also would be a lower volume remaining for the fundamental filter material in the form of the activated carbon.

Accordingly, the preferred mode of the embodiment in the invention includes making each of the discussed parts as a separate item in the manner described above. There is still a relative minimum number of parts, they are extremely easy to assemble even with the use of substantially full automation and the result not only is an attractive replacement cartridge but also one which obtains the desired result of the clearly discernable color reference system for approximating amount of usage.

At the same time, a filter cartridge has been disclosed which, on the one hand, is capable of being used in a number of different appliances which have various respectively different utilities. On the other hand, the approach discussed above may also find advantageously utility in a specific different detailed configuration so that the cartridge will be adapted into use with some different more of construction for any of a variety of different kinds of appliances.

While the specific embodiment described in full is that of the presently known best mode of implementation, it should be observed that the improved features may be obtained in cartridges made specifically different so as not as well take advantage of all elements of the combination. For example, the location of an opening or the length of a water flow path might be changed in a manner that achieves only partial best-mode utility. Yet, the new features remain advantageous for adoption in any such less preferable alternatives.

While a particular embodiment of the present invention has been shown and described, and various alternatives and modifications have been disclosed, it will be obvious to those skilled in the art that changes and modifications may be made without departing from the invention in its broader aspects. Therefore, the aim in the appended claims is to cover all such changes and modifications as fall within the true spirit and scope of that which is patentable.

We claim:

1. In a water filter cartridge having a shell within which is confined a water filtration material and having opposite first and second end walls, a conduit disposed through said material from a first opening in one of said end walls to a second opening in the other of said end walls, a third opening in one of said end walls spaced from one of said first and second openings for communicating the flow of water with said material and a fourth opening in the other of said end walls spaced from the other of said first and second openings for communicating the flow of water with said material at a location spaced from said third opening, the improvement comprising:

a hollow water filtration element of a cylindrical porous medium shaped to nest within a portion of said shell encircling a corresponding portion of said material and defining a space between said medium and the inner side wall of said shell with said space being in the entire path of water flow between said third opening and said material through said medium;

and a reference color exhibited over a portion of the exterior side wall of said shell adjacent to the location within said shell of said medium with said medium exhibiting a given color upon the beginning of usage but changing color with continued usage in response to its entrapment of matter in said water and with said shell being transparent over said medium to enable a user to compare said medium and reference colors.

2. A water filter as defined in claim 1 in which another portion of said shell continues beyond said medium to encircle an additional portion of said material with said material being of a color distinctly different from said reference color and with said other portion of said shell being transparent.

3. In a water filter cartridge having a shell within which is confined a water filtration material and having opposite first and second end walls, a conduit disposed through said material from a first opening in one of said end walls to a second opening in the other of said end walls, a third opening in one of said end walls spaced from one of said first and second openings for communicating the flow of water with said material and a fourth opening in the other of said end walls spaced from the other of said first and second openings for communicating the flow of water with said material at a location spaced from said third opening, the improvement comprising:

a water filtration element of a porous medium shaped to nest within a portion of said shell encircling a corresponding portion of said material and defining a space between said medium and the inner side wall of said shell with said space being in the path of water flow between said third opening and said material through said medium;

a reference color exhibited over a portion of the exterior side wall of said shell adjacent to the location within said shell of said medium with said medium exhibiting a given color upon the beginning of usage but changing color with continued usage in response to its entrapment of matter in said water and with said shell being transparent over said medium to enable a user to compare said medium and reference colors;

and a water-impervious cap spaced outwardly from said third opening and in closure of said outer end of said shell to define a water flow path communicating with said third opening over the corresponding end wall.

4. A water filter as defined in claim 1 in which another water filtration element is disposed in the path of water flow in communication with said material through said fourth opening.

5. A water filter as defined in claim 1 in which said third opening is defined on the periphery of the corresponding end wall to overlie said space between said medium and said inner side wall.

6. A water filter as defined in claim 5 in which a water-porous filter ring is nested within said shell at one end of said element and between said space and said third opening.

7. In a water filter cartridge having a shell within which is confined a water filtration material and having opposite first and second end walls, a conduit disposed through said material from a first opening in one of said end walls to a second opening in the other of said end walls, a third opening in one of said end walls spaced from one of said first and second openings for communicating the flow of water with said material and a fourth opening in the other of said end walls spaced from the other of said first and second openings for communicating the flow of water with said material at a location spaced from said third opening, the improvement comprising:

a water filtration element of a porous medium shaped to nest within a portion of said shell encircling a corresponding portion of said material and defining a space between said medium and the inner side wall of said shell with said space being in the path of water flow between said third opening and said material through said medium;

a reference color exhibited over a portion of the exterior side wall of said shell adjacent to the location within said shell of said medium with said medium exhibiting a given color upon the beginning of usage but changing color with continued usage in response to its entrapment of matter in said water and with said shell being transparent over said medium to enable a user to compare said medium and reference colors.

said third opening and the corresponding one of said first and second openings being formed in a plug that forms the corresponding end wall with said third opening being defined around the periphery of said plug.

8. A water filter as defined in claim 7 in which a water-pervious filter ring is nested within said shell at one end of said element and between said space and said third opening.

9. A water filter as defined in claim 8 in which said plug includes a circumferentially-spaced series of tabs that project laterally outward from said plug to nest within said shell and lie against said filter ring.

10. A water filter as defined in claim 1 in which the inner wall of said shell is shaped to define an inwardly-stepped shoulder against which said element is seated.

11. A water filter as defined in claim 1 in which the inner wall cross-section is gradually enlarged in progression toward said third opening and said element is located within the larger portion of said inner wall in definition of said space.

12. A water filter as defined in claim 1 in which said element includes at one end thereof a lateral enlargement sized to seat within said shell when the other end of said element is located in position properly aligned with respect to said third opening.

13. In a water filter cartridge having a shell within which is confined water filtration material and having opposite first and second end walls, a conduit disposed through said material from a first opening in one of said end walls to a second opening in the other of said end walls, a third opening in one of said end walls spaced from one of said first and second openings for communicating the flow of water with said material and a fourth opening in the other of said end walls spaced from the other of said first and second openings for communicating the flow of water wtih said material at a location spaced from said third opening, the improvement comprising:

a hollow water filtration element of a cylindrical porous medium shaped to nest within a portion of said shell encircling a corresponding portion of said material and defining a space between said medium and the inner side wall of said shell with said space being in the entire path of water flow between said third opening and said material through said medium;

and said third opening being defined on the periphery of the corresponding end wall to overlie said space between said medium and said inner side wall.

14. A water filter as defined in claim 13 in which a water-impervious cap is spaced outwardly from said third opening and closes said outer end of said shell to define a water flow path communicating with said third opening over the corresponding end wall.

15. A water filter as defined in claim 13 in which a water-porous filter ring is nested within said shell at one end of said element and between said space an said third opening.

16. A water filter as defined in claim 13 in which said third opening and the corresponding one of said first and second openings are formed in a plug that forms the corresponding end wall with said third opening being defined around the periphery of said plug.

17. A water filter as defined in claim 16 in which a water-pervious filter ring is nested within said shell at one end of said element and between said space and said third opening.

18. A water filter as defined in claim 17 in which said plug includes a circumferentially-spaced series of tabs that project laterally outward from said plug to nest within said shell and lie against said filter ring.

19. A water filter as defined in claim 13 in which the inner wall of said shell is shaped to define an inwardly-shaped shoulder against which said element is seated.

20. A water filter as defined in claim 13 in which the inner wall cross-section is gradually enlarged in progression towards said third opening and said element is located within the larger portion of said inner wall in definition of said space.

21. A water filter as defined in claim 13 in which said element includes at one end thereof a lateral enlargement sized to seat within said shell when the other end of said element is located in position properly aligned with respect to said third opening.

22. In a water filter cartridge having a shell within which is confined a water filtration material and having opposite first and second end walls, a conduit disposed through said material from a first opening in one of said end walls to a second opening in the other of said end walls, a third opening in one of said end walls spaced from one of said first and second openings for communicating the flow of water with said material and a fourth opening in the other of said end walls spaced from the other of said first and second openings for communicating the flow of water with said material at a location spaced from said third opening, the improvement comprising:

a hollow water filtration element of a cylindrical porous medium shaped to nest within a portion of said shell encircling a corresponding portion of said material and defining a space between said medium and the inner side wall of said shell with said space being in the entire path of water flow between said third opening and said material through said medium.

* * * * *

UNITED STATES PATENT OFFICE
CERTIFICATE OF CORRECTION

Page 1 of 2

Patent No. 5,114,570                    Dated May 19, 1992

Inventor(s) Sharon L. Nelson, et al.

It is certified that error appears in the above-identified patent and that said Letters Patent is hereby corrected as shown below:

Column 1, line 41:   "adapted" should be -- adapt --.

Column 1, line 57:   "relay" should be -- rely --.

Column 1, line 65:   "wall sis" should be -- walls is --.

Column 2, line 34:   "referenced" should be -- reference --.

Column 2, line 65:   "in" should be -- a --.

Column 3, line 67:   "304" should be -- 30 --.

Column 4, line 34:   "at op" should be -- atop --.

Column 4, line 38:   "perifery" should be -- periphery --.

Column 5, line 3:    the numeral "4" should be deleted.

Column 5, line 13:   "are" should be -- area --.

Column 6, line 20:   "more" should be -- mode --.

UNITED STATES PATENT AND TRADEMARK OFFICE
CERTIFICATE OF CORRECTION

PATENT NO. : 5,114,570

DATED : May 19, 1992

INVENTOR(S) : Sharon L. Nelson, et al.

It is certified that error appears in the above-identified patent and that said Letters Patent is hereby corrected as shown below:

Column 8, line 53, "with" should be --with--.

Signed and Sealed this

Seventeenth Day of August, 1993

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,114,570

DATED : May 19, 1992

INVENTOR(S) : Sharon L. Nelson, John E. Petrovic & Gerald T. Swanson

It is certified that error appears in the above-identified patent and that said Letters Patent is hereby corrected as shown below:

Column 4, line 40: "36" should read -- 26 --.

Column 4, line 41: after "rim", insert --49 --.

Signed and Sealed this

Seventh Day of December, 1993

Attest:

BRUCE LEHMAN

Attesting Officer

Commissioner of Patents and Trademarks